March 7, 1939.  J. S. CANTELO  2,149,389

CASTER

Filed Aug. 23, 1935

INVENTOR-
John S. Cantelo

Patented Mar. 7, 1939

2,149,389

UNITED STATES PATENT OFFICE 2,149,389

CASTER

John S. Cantelo, East Cambridge, Mass.

Application August 23, 1935, Serial No. 37,541

4 Claims. (Cl. 16—47)

This invention relates to casters and more particularly to an improved form of caster for use on portable shoe racks commonly used by shoe manufacturers for moving shoes from place to place over the floors of the factory in the process of manufacture. This caster is not alone adapted to shoe racks but in many other fields where casters are used. As a shoe rack is thus moved over the floors the wheels of its casters invariably pick up debris such as string, wax thread, lasting wires, together with lasting tacks and various other obstructions which collect on the floors of the factory and become intermixed by the trailing and swiveling of the casters over the floors resulting in the clogging of the wheels so they cease to function, causing annoyance and expense to remove such obstruction from the casters. A prime object of the invention is to provide an improved form of caster wheel equipped to automatically remove such expensive and troublesome annoyance now confronting the shoe manufacturing industry. A further object is to provide an especially strong and reliable caster capable of withstanding strenuous handling which is common practice by those who operate the same. The foregoing and other objects and features of the invention will be better understood from the following detailed description taken in connection with accompanying drawing and will be thereafter pointed out in the appended claims.

Referring to the drawing—

Figure 1:
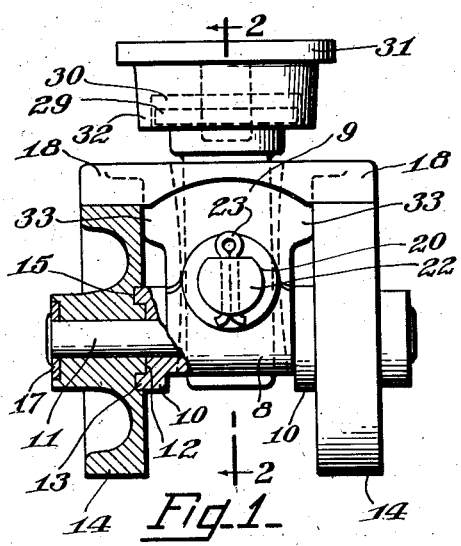
Fig. 1 is a front elevation with portions broken away in section.
Figure 2:
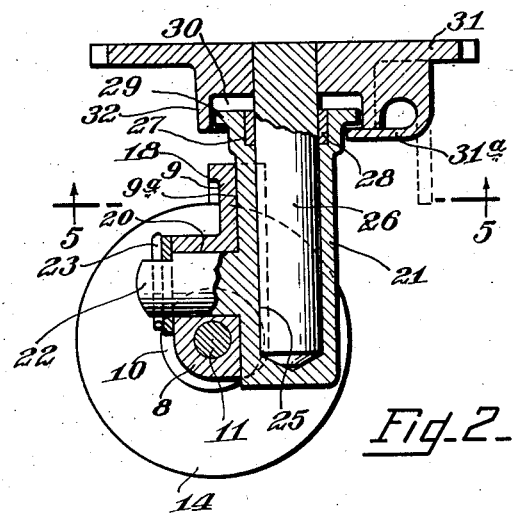
Fig. 2 is a vertical cross section taken on line 2—2 of Fig. 1.
Figure 3:
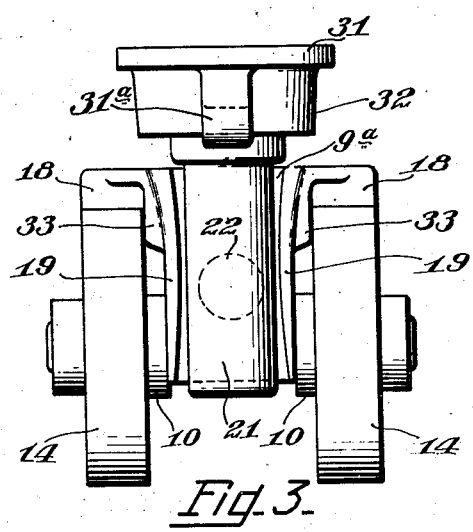
Fig. 3 is a rear elevation.
Figure 4:
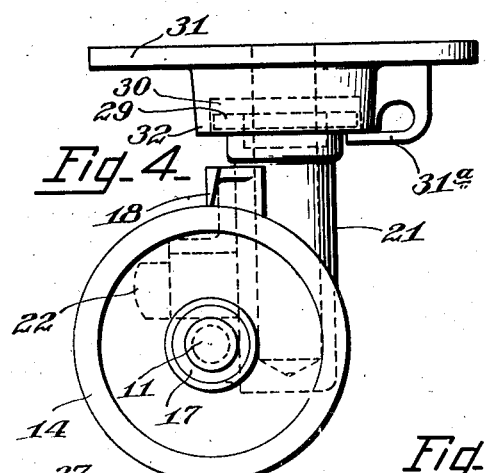
Fig. 4 is a side elevation.
Figure 5:
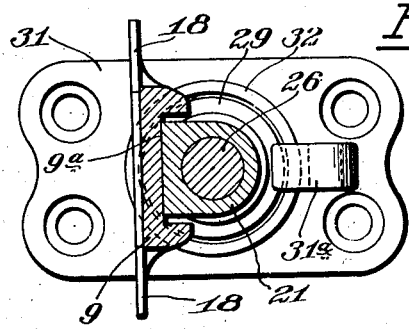
Fig. 5 is a horizontal section taken on line 5—5 Fig. 2.
Figures 6, 7:
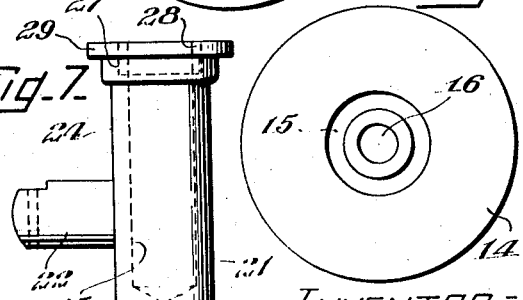
Fig. 6 is an elevation of the inside of wheel of caster.
Fig. 7 is a detailed side elevation of the vertical sleeve having a right angle pivot integral therewith.

My improved caster is formed with a bearing member 8 having annular tongues 13 on its two sides 12; extending lateraly outward an axle 11 is mounted transversely through the bearing member 8 for the reception of wheels 14 mounted on its two sides. The wheels 14 have flat inner surfaces with annular grooves 15 central thereof and circular perforations 16 central the annular grooves 15, for the reception of axles. The annular tongues 13 telescope with the annular grooves 15 when mounting the wheels 14 on the axle 11 and are held in relation therewith by washers 17 riveted on the outer ends of the axle. Bearing member 8 has flat inner surface 9a extending from the bottom thereof upwardly terminating at the upper edge of scraper blades 18 as transversely illustrated in horizontal section Fig. 5, numeral 9a, line 5—5 Fig. 2. Pivot sleeve 21 has a lateral projection 22 on which bearing member 8 is pivoted, said member being provided on one side with the flat inner surface 9a having spaced apart longitudinal ribs 19 between which pivot sleeve 21 is mounted. Said ribs are slightly curved to conform to the right and left radial swing of the bearing member 8 on the axis of lateral projection 22 for the purpose of adjusting the wheels to floors of uneven surface.

A pivot sleeve 21 has a cylindrical bearing opening 25 extending below the axis of the lateral projection 22 for the reception of a bearing pivot 26 and annular chamber 27 in the upper end of opening 25 for the reception of a hardened bearing ring 28 mounted in said chamber and engaged by pivot bearing member 26, ring 28 being hardened for the purpose of reducing friction when swiveling on the bearing pivot 26 of softer material. The pivot sleeve 21 has a lateral circular flange 29 on its upper end extending into a dependent circular recess 30 capped with an attaching plate 31, bearing pivot 26 extending downward through attaching plate 31 central the circular recess 30 terminating at the bottom of pivot sleeve 21 and held in swiveling relation therewith by a dependent clip 31a bent upwardly against the lower edge of the dependent flange 32 and under the lateral flange 29 of pivot sleeve 21. Bearing member 8 has integral scraping blades 18 in combination therewith projecting laterally therefrom and closely engaging the peripheral surfaces of the wheels 14, bearing member 8 having side surfaces 33 closely engaging and lateraly reinforcing the inner sides of the wheels 14 adjacent their periphery. Numeral 10 illustrates peripheral surface of annular tongues 13. While the preferred embodiment of the invention has been herein illustrated and described it will be understod that the invention may be embodied in other forms within the scope of the following claims.

The annular tongues 13 form hubs on the bearing member and the opening below the side surfaces 33 extends from said side surfaces to the hub. These openings allow dirt or other material to pass between the bearing member and the wheels without clogging therein.

Having described my invention what I claim as new and desire to secure by Letters Patent, is:

1. A caster comprising a pair of wheels, a bearing member on which said wheels are mounted, a pivot sleeve having a lateral projection on which said bearing member is pivoted, and means to pivotally support said pivot sleeve, said sleeve and bearing member having associated flat bearing surfaces providing extended bearing contact between said parts both above and below said lateral projection.

2. A caster comprising a pair of wheels, a bearing member on which said wheels are mounted, a pivot sleeve having a lateral projection on which said bearing member is pivoted, and means to pivotally support said pivot sleeve, said sleeve and bearing member having associated flat bearing surfaces providing extended bearing contact between said parts, and said bearing member having spaced longitudinal ribs embracing said pivot sleeve but spaced slightly therefrom and constituting stops to limit swinging movement of said bearing member on said sleeve.

3. In a caster, a pivot sleeve having an integral lateral projection at a substantial distance from its upper and lower ends, said sleeve having a longitudinal bearing opening therein, and a bearing member mounted on said lateral projection, said bearing opening extending across the axis of said lateral projection and a substantial distance below said axis for the purpose of lengthening said pivot bearing member, in this way reducing friction when trailing and swiveling in said sleeve.

4. A caster comprising a bearing member, an axle in said bearing member, a pair of wheels having substantially flat inner surfaces mounted on said axle on opposite sides of said bearing member, said bearing member providing a hub adjacent to each wheel and said bearing member having integral scraping blades projecting laterally outward from the member nearly to the peripheral surfaces of the wheels, said bearing member also having side surfaces closely engaging the inner sides of and laterally reinforcing the wheels adjacent their periphery, said bearing member being cut away to provide an opening between said member and each wheel, said opening extending from said side surfaces downward to the hub on the bearing member.

JOHN S. CANTELO.